May 18, 1937.   A. B. RAY   2,080,578

APPARATUS FOR TREATING GASES

Filed Jan. 20, 1934

INVENTOR
ARTHUR B. RAY.
BY
ER Greenewald
ATTORNEY

Patented May 18, 1937

2,080,578

UNITED STATES PATENT OFFICE 2,080,578

APPARATUS FOR TREATING GASES

Arthur B. Ray, Bayside, N. Y., assignor, by mesne assignments, to Union Carbide and Carbon Corporation, a corporation of New York Application January 20, 1934, Serial No. 707,449

10 Claims. (Cl. 183—4)

This invention relates to the treatment of gases such as air, for purifying them and/or for recovering valuable substances present in such gases.

In many industrial processes solvents are employed that vaporize in air and are lost if not recovered. For example, in the manufacture of artificial silk by a process now in extensive use, ether or both alcohol and ether vaporize in air; in the manufacture of rubber goods by a well-known process, naphtha vaporizes in air; and in the spraying of automobile bodies with well-known lacquer, a solvent containing butyl acetate, ethyl acetate and toluol vaporizes in air.

The concentrations of such vaporized substances in air generally are very low, but nevertheless the problem of recovering the valuable substances has assumed considerable importance. Thus in the last instance mentioned above, with the cost of such lacquer solvents relatively high, it is quite evident that a substantial saving is effected by recovering the vaporized solvent. Since the concentrations of the valuable substances in air are low, the apparatus adopted must be capable of treating large volumes of air and must obtain a maximum amount of solvent recovery with a minimum expenditure of power, and must be designed to facilitate frequent revivification of the adsorbent in situ.

Among the more important objects of this invention, therefore, is to provide an improved apparatus for treating economically and efficiently large volumes of gases such as air from which it is desired to remove or recover substances contained therein, and for recovering the adsorbed substances at frequent intervals.

Figure 1:
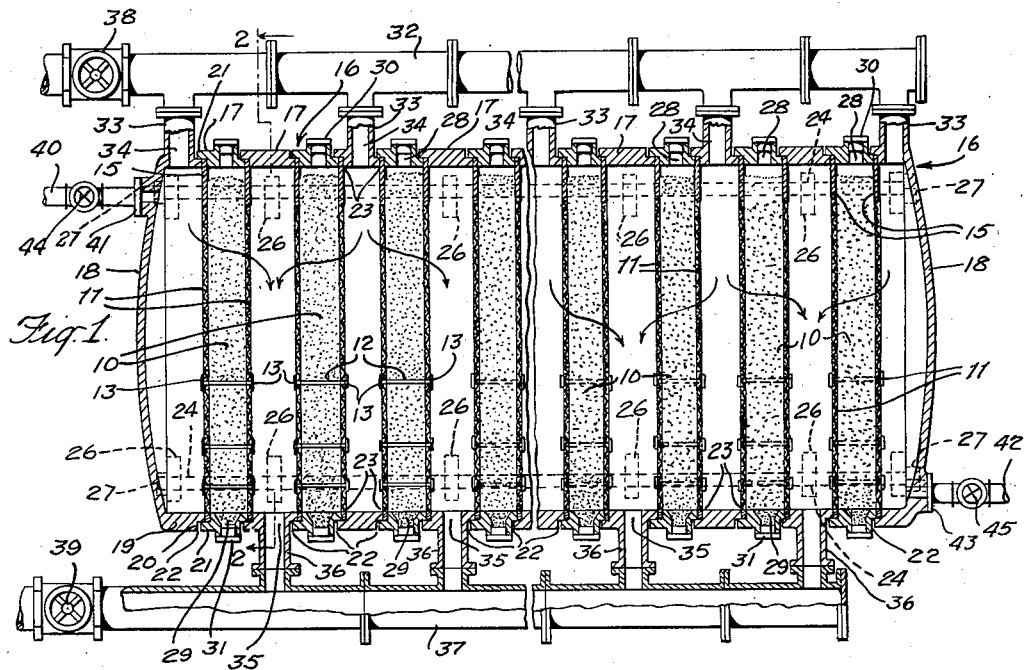
Figure 2:
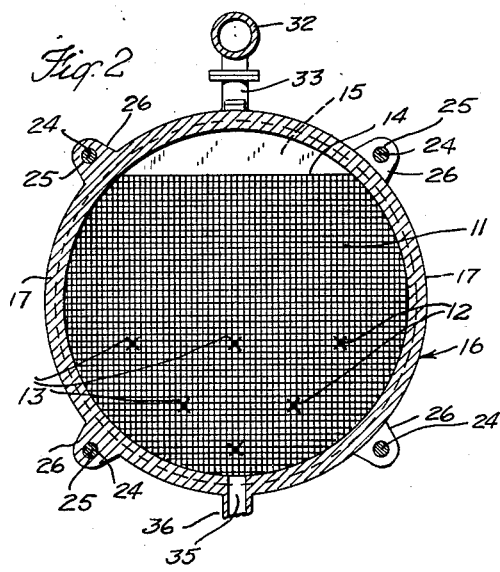

My invention will be more fully set forth in the following description and accompanying drawing, in which:

Fig. 1 is a longitudinal vertical section of apparatus embodying this invention; and Fig. 2 is a transverse sectional view taken on line 2—2 of Fig. 1.

In accordance with this invention, a large bed area of a material capable of adsorbing valuable substances in air is arranged to have a large surface area in the minimum amount of space. The adsorbent material preferably employed is granular active adsorbent carbon such as described and claimed in United States Patent No. 1,497,543, granted June 10, 1924 to Newcomb K. Chaney.

For the purpose of limiting the power required to circulate the substance-laden air through the active adsorbent carbon or other adsorbent to remove the valuable substances in the air, by reducing to a minimum the resistance to the flow of air, a plurality of thin beds of the adsorbent material are provided. These thin beds are arranged and adapted to be treated in situ for driving off from the solid adsorbent the valuable substance adsorbed thereby, thus "revivifying" the same, to prepare it for subsequent use.

Referring to Fig. 1, the apparatus embodying the invention comprises a plurality of vertically-disposed layers or beds 10 of granular active adsorbent carbon arranged in longitudinally-spaced relation to each other. These beds are formed by retaining the adsorbent material between pairs of spaced, cooperating perforate members or screens 11. These screens are prevented from bulging by tie-pins 12 which extend through cooperating adjacent screens, the ends of which pins are provided with flat anchors 13 that bear against the outer surfaces of the screens.

As shown in Fig. 2, the upper edges of the screen 11 are secured at 14 to solid plates 15; the associated screens 11 and plates 15 together forming retaining walls substantially circular in shape. These solid plates 15 at the upper ends of the screens 11 prevent by-passing of the carbon layers by the air at the upper surfaces of the layers 10, due to settling of the granules of carbon.

The layers 10 of solid adsorbent are arranged in uniform spaced relation with a horizontally-disposed cylindrical pressure-tight vessel 16 which may be formed of a plurality of interassociated annular intermediate members or sections 17 and end heads 18 held together in any suitable manner. As shown in Fig. 1, the end heads 18 are provided with annular flanges 19, the ends of which are stepped or flanged at 20 to receive the flanged or stepped end 21 of the adjacent annular sections 17 to form a seal or slip joint 22 therebetween, adapted to be made gas tight. The ends of the annular sections 17 are likewise stepped to form between them similar sealing joints 22.

The circular wall members comprising the screens 11 and solid plates 15 are mounted within the pressure vessel 16 and secured at their entire outer peripheral margins 23 at the inner sides of the sealing joints 22, each successive pair of screens and included annular member forming a container. The detachable end heads 18 and annular sections 17 are secured together as a unit to form the pressure-tight vessel 16 by readily detachable means such as threaded members 24 which extend freely through openings 25 in projecting lugs 26. These may be formed integral with the end heads 18 and the annular sections 17, as shown in Fig. 2. The members 24 are threaded to receive tightening nuts 27.

The first annular sections 17 from each end and alternate sections 17 in the body of the vessel 16 have inlet opening 28 at the top thereof for admitting the active adsorbent carbon granules into the space between the pair of co-operating screens 11. They also have outlet opening 29 at the bottom thereof for discharging the carbon material therefrom. The openings 28 and 29 are provided with closure members 30 and 31, respectively, which may be secured to the annular sections 17 in any suitable manner, such as by clamping bolts (not shown), to prevent air leakage and prevent losses of valuable fluids during use of the pressure filter.

The air laden with the valuable substance to be recovered flows from a main inlet conduit 32 to which is connected a plurality of branch lines 33 in communication with inlet openings 34 at the tops of the end heads 18 and of alternate annular sections 17 therefrom. The conduits 33 are arranged to communicate with alternate spaces between adjacent layers 10 of active adsorbent. By this construction, all of the air flowing through each conduit 33 passes through and in intimate contact with one layer of adsorbent material, as indicated by the arrows in Fig. 1. In passing in intimate contact therewith, the valuable substance is adsorbed by the carbon or the like and removed from the air. These spaces between the layers 10 that are not provided with fluid inlet openings 34 have fluid outlet openings 35 at the bottoms thereof. After the substance-laden air passes through the layers 10 of adsorbent material, the air, with substantially all of the valuable substance removed therefrom, flows through the outlets 35 and conduits 36 to a main outlet conduit 37, through which it may be discharged to the atmosphere, or may be recirculated through the area where the valuable substances are being vaporized in the air. Obviously the direction of flow of the gases and vapors during either or both the adsorption step and the revivification step may be reversed from that described above without departing from the spirit of the invention.

After the vapor-laden air has passed through the layers of carbon for a considerable length of time and the carbon has adsorbed a relatively large amount of solvent a condition is reached when the carbon can no longer completely remove the solvent from the air. When this occurs, the inlet and outlet valves 38 and 39 in the conduits 32 and 37 are closed. The carbon layers are then treated to drive off the adsorbed substance, and to reactivate the carbon in situ, so that it will be capable of adsorbing more of the substance vaporized in the air.

In accordance with this invention, the layers 10 of active adsorbent carbon in the pressure vessel 16 are treated in situ to revivify the carbon quickly, so that the apparatus will be out of operation for the minimum length of time. This may be accomplished by admitting saturated or superheated steam under pressure into the pressure vessel 16 through a conduit 40 connected at 41 to the end head 18, and then maintaining the vessel under pressure so as to heat the carbon to a relatively high temperature. The steam passes through the layers 10 of carbon, and the mixture of steam and the substance removed from the carbon is then discharged from the pressure vessel 16 into a conduit 42 which is connected at 43 to the right hand end head 18. The substance mixed with the steam may then be recovered in any suitable manner, such as by condensation and separation or by rectification.

In order to effectively remove relatively high boiling solvents from the carbon layers 10 they must be heated by the steam to a temperature above the boiling point of the adsorbent solvents. The carbon beds thus freed of their solvent load can be used again to recover solvent from the vapor-laden air. In apparatus of the type above-described, it has been found that steam pressures up to 200 lbs. per sq. in. can be used to effectively revivify the carbon layers to provide carbon having excellent absorptive capacity.

After substantially all of the valuable substance is removed from the carbon layers 10, the valves 44 and 45 in the conduits 40 and 42 are closed, and the carbon cooled. For preventing possible combustion of the carbon during the cooling period, it is preferable in some cases when heating has been effected by superheated steam to cool the carbon to approximately 212 degrees Fahrenheit by passing saturated steam through the carbon layers 10. Further cooling may then be obtained by passing air through the pressure vessel 16 in any suitable manner. When the treating and cooling of the carbon are completed, air containing the substance to be recovered may again be passed through the layers 10 of carbon. In many cases it is unnecessary to cool the carbon before admitting the vapor-laden air.

It is to be understood that the carbon layers illustrated in the drawing are purposely exaggerated for sake of clearness, and preferably range from 3 to 8 inches in thickness.

By providing two treating units with suitable valve connections, the operation may be substantially continuous, one unit always being in operation while the other unit is being treated to revivify the carbon and recover the valuable substance or mixture of substances contained in the air.

The following details relate to a solvent recovery treatment involving the use of the pressure absorber of the present invention. The fluid treated is air containing a solvent mixture vaporized during the lacquering of automobile bodies, the said solvent being present in the air in an amount around .105 lb. per 1000 cubic feet of air. A plurality of carbon-containing filter beds, each 4 inches in thickness and having a total effective surface area of 1650 square feet, will serve to treat the above fluid mixture at the rate of 35,000 cubic feet per minute. The active absorbent carbon required for the purpose occupies a volume of approximately 550 cubic feet and weighs 18,000 lbs. With the above arrangement in my cylindrical pressure absorber the air being treated blows through the respective filter beds at a linear velocity of approximately 21 feet per minute. In a preferred operation in which the absorbent carbon is of from 6 to 20 mesh in size, the resistance to air flow through the bed is equivalent to less than 1 inch of water. Under these conditions the vapor-laden air has approximately a .9 second contact with the carbon bed. This has been found ample to allow adsorption and complete stripping of the vapor from the air. The above-mentioned extremely low air resistance adapts the present absorber admirably for a very low cost solvent recovery treatment where extremely large volumes of air or other fluid carry very small amounts of the fluid whose recovery is desired.

I claim:

1. Apparatus for recovering a vaporous constituent of a gas, comprising the combination of a pressure-tight vessel, including a plurality of annular flanged interfitting members disposed in series between flanged end members, a plurality of compartments formed between alternating annular members and having perforate side walls adapted to contain adsorbent carbon and maintain the same in thin, vertically-disposed spaced layers, means for introducing granular material into the said compartments, said annular members forming a plurality of fluid compartments intermediate the last-named compartments, regulatable means for admitting gas containing the component to be recovered into every second one of the said fluid compartments, regulatable means for conducting gas from each of the remaining fluid compartments, and means for flowing steam through and from each of the said fluid compartments and said pressure vessel.

2. Apparatus for recovering a vaporous constituent of a gas, comprising the combination of a pressure-tight vessel including a plurality of annular members having their ends in abutting relation, a plurality of pairs of spaced cooperating perforate members having the edges thereof respectively sealed within the vessel between the abutting ends of adjacent annular members, each of the said pairs defining therebetween a filter compartment adapted to contain a solid adsorbent material, regulatable means including inlet connections in communication with alternate spaces formed between the filter compartments for passing the gas to be treated into the said vessel, regulatable means including outlet connections in communication with each of the remaining spaces between the filter compartments for conducting gas from the pressure vessel, and means for passing high temperature steam through and from said vessel and filter compartments.

3. Apparatus as defined in claim 2 in which said perforate members are substantially flat and comprises wire screens mounted substantially vertically in said vessel and removably secured at the margins thereof between members forming a portion of the wall of said pressure vessel, the top portions of each screen being solid downward for a substantial distance for preventing the gas from by-passing the carbon layers in the filter compartments as the carbon settles in use.

4. Apparatus for recovering a vaporous constituent of a gas, comprising the combination of a sectional pressure vessel composed of a pair of end members and a plurality of annular intermediate members, each of the respective end and intermediate members having flanged end margins adapted to fit in the corresponding flanged margin of the next adjacent member, a plurality of perforate members within the said vessel, each of the said perforate members being removably mounted between the cooperating flanges of adjacent end and/or intermediate members, means for connecting together said end members and intermediate members under pressure to define a plurality of spaced compartments, independent means for introducing a solid adsorbent into alternate compartments defined by said perforate members, means establishing regulated communication between every second one of the compartments between those into which solid adsorbent is introduced and a raw gas inlet, and means establishing regulated communication between the remaining compartments between those into which solid adsorbent is introduced and a gas outlet.

5. Apparatus for recovering a vaporous constituent of a gas, comprising a sectional pressure-tight vessel composed of a pair of end members having flanged end margins and a plurality of annular, intermediate members having flanged peripheral end margins adapted to cooperate with corresponding margins of adjacent members to define the gas-tight vessel, means detachably securing together the said ends and intermediate members, a plurality of fluid-permeable members respectively mounted in the vessel between each of the respective end members and an adjacent intermediate member, and between adjacent intermediate members, and adapted to separate the interior of the vessel into a plurality of compartments, means for charging solid adsorbent material into and for discharging it from every second compartment, means connecting every second one of the remaining compartments to a source of the fluid to be treated, outlet means leading from the balance of the remaining compartments, and means for directing a revivifying fluid through each of the respective compartments containing solid adsorbent and for removing the said fluid from the vessel.

6. Apparatus for recovering a vaporous constituent of a gas, comprising a sectional pressure-tight vessel composed of a pair of end members having stepped flanges and a plurality of annular, intermediate members having stepped flanges adapted to interfit with corresponding stepped flanges of adjacent intermediate members and said end members to define the gas-tight vessel, means detachably securing together said end members and said intermediate members, a plurality of fluid permeable members respectively mounted in the vessel between each of the respective end members and adjacent intermediate members, and between adjacent intermediate members, and adapted to separate the interior of the vessel into a plurality of compartments, means for charging solid adsorbent material into and for discharging it from every second compartment, means connecting every second one of the remaining compartments to a source of the fluid to be treated, outlet means leading from the balance of the remaining compartments, and means for directing a revivifying fluid through each of the respective compartments containing solid adsorbent and for removing the said fluid from the vessel.

7. Apparatus for recovering a vaporous constituent of a gas, comprising a sectional pressure-tight vessel composed of a pair of end members having flanged end margins and a plurality of annular, intermediate members having flanged peripheral end margins adapted to cooperate with corresponding margins of adjacent members to define the gas-tight vessel, means detachably securing together the said ends and intermediate members, a plurality of fluid permeable members mounted in the vessel between each of the respective end members and intermediate members adapted to separate the interior of the vessel into a plurality of compartments, openings in the walls of said annular members for charging solid adsorbent material into and for discharging it from every second compartment, means connecting every second one of the remaining compartments to a source of the fluid to be treated, outlet means leading from the balance of the remaining compartments, and means for directing a revivifying fluid through each of the respective compartments containing solid adsorbent and for removing the said fluid from the vessel.

8. Apparatus for recovering a vaporous constituent of a gas, comprising a plurality of annular members having flanged end margins and disposed in series with the flanges of each annular member in engagement with the flanges of the next adjacent members to define a gas-tight chamber, a series of gas permeable members each having a solid imperforate upper portion and respectively mounted vertically within the pressure vessel and secured between the said flanges of adjacent annular members, thereby forming a series of compartments intermediate the ends of the chamber, means for filling every alternate compartment with solid adsorbent material and for withdrawing spent solid material therefrom, means including a valve controlled main conduit and branch conduits leading therefrom to every second one of the remaining compartments for admitting gas thereto, means including a valve-controlled main conduit and branch conduits connected thereto and communicating with the rest of the remaining compartments for withdrawing gas therefrom, and means for passing steam through each of the various compartments.

9. Apparatus for recovering a vaporous constituent of a gas, comprising a plurality of annular members having flanged end margins and disposed in series with the flanges of each annular member adapted to cooperate with the flanges of the next adjacent members to define a gas-tight chamber, means for securing and maintaining in engagement the abutting flanged margins of the series of annular members for producing a gas-tight seal therebetween, a series of gas permeable members each having a solid imperforate upper portion and respectively mounted vertically within the pressure vessel and secured between the said flanges of adjacent annular members, thereby forming a series of compartments intermediate the ends of the chamber, openings in the walls of said annular members for filling every alternate compartment with solid adsorbent material and for withdrawing solid material therefrom, removable enclosures for the openings in said annular members, valve controlled fluid inlets leading respectively to every second one of the remaining compartments, valve controlled fluid outlets leading respectively from the rest of the remaining compartments, and means for passing steam through each of the various compartments.

10. Apparatus for recovering a substance vaporized in a gas such as air, comprising the combination of a horizontal pressure vessel including a plurality of annular members arranged end to end, means for securing said members together, a plurality of spaced perforate members disposed between said annular members and arranged vertically within said pressure vessel with each successive pair of such perforate members and included annular member forming a container adapted to hold granular active adsorbent carbon in a thin layer, each of said included annular members having openings respectively at the top and bottom for charging and discharging the granular carbon into and from said containers, means for admitting gas containing the vaporized substance into said pressure vessel whereby the gas will flow substantially horizontally through the carbon in said containers, means for conducting the gas from said vessel after passing through said carbon containers, and means for passing high temperature steam through said carbon containers to treat the carbon in situ and remove the substance absorbed thereby.

ARTHUR B. RAY.